May 23, 1972           K. H. HAAS           3,664,751

ACCESSORY FOR MICROSCOPES FOR USE AS A TWO-BEAM PHOTOMETER

Filed March 23, 1970

KARL HEINZ HAAS
*INVENTOR*

BY *Krafft & Wells*

3,664,751
ACCESSORY FOR MICROSCOPES FOR USE AS A TWO-BEAM PHOTOMETER
Karl Heinz Haas, Wetzlar, Germany, assignor to Ernst Leitz G.m.b.H., Wetzlar, Germany
Filed Mar. 23, 1970, Ser. No. 21,721
Claims priority, application Germany, Mar. 27, 1969, P 19 15 680.0
Int. Cl. G01j 1/42; G02b 21/06
U.S. Cl. 356—219                    10 Claims

ABSTRACT OF THE DISCLOSURE

An accessory for microscopes comprises a diaphragm and a light source at one side thereof for illuminating the same. A beam splitter is provided at the other side of the diaphragm for dividing a light beam from the microscope eyepiece into a measuring light beam and an observation light beam. Means are provided between the beam splitter and the diaphragm for forming an image of the diaphragm alternately via each of two optical paths in a plane conjugate with the diaphragm and coincident with the focal plane for a light beam from the microscope eyepiece. With the beam splitter are optical means associated for imaging the diaphragm aperture in the focal plane of the observation light beam.

BACKGROUND OF THE INVENTION

The present invention relates to an improvement in or modification of accessories for or components of microscopes for use as photometers, disclosed in U.S. Pat. 3,421,806.

In U.S. Patent 3,421,806 there is described an accessory for a microscope comprising a diaphragm having an aperture, a light source at one side of the diaphragm for illuminating the same, a beam splitter at the other side of the diaphragm for dividing a light beam from the eyepiece of the microscope into a measuring light beam and an observation light beam, and optical means at the other side of the diaphragm, said optical means being arrangeable or arranged between the diaphragm and the eyepiece of the microscope for forming an image of the diaphragm aperture in the image plane of the observation light beam. It is further provided that the diaphragm is preferably an iris diaphragm. Where the accessory or component is for use as a photometer, a photoelectric sensing device is provided at the same side of the diaphragm as the light source, a mirror turnable from the path of the light being arranged between the diaphragm and the photoelectric sensing device for effecting illumination of the diaphragm from the light source. The mirror turnable from the path of the light may be replaced by a beam splitting device.

In such a photometer, the beam splitting surface of the beam splitter may be so disposed that the observation light beam originating on reflection of a light beam from the eyepiece of the microscope at the splitting surface passes directly to an observation system, whereas an image of the diaphragm aperture after reflection at said beam splitting surface, is first reflected at an auxiliary totally reflecting mirror and enters the observation system after passing through the beam splitting surface. Alternatively, the beam splitting surface of the beam splitter may be so disposed that the observation light beam originating on reflection of a light beam from the eyepiece of the microscope at the splitting surface on reflection at said beam splitting surface after further reflection at an auxilary totally reflecting mirror, enters the observation system having passed through the beam splitting surface, whereas an image of the diaphragm aperture after reflection at said beam splitting surface passes directly to the observation system. Such a photometer for microscopes operates by the single-beam measuring system. In many cases, however, it is required to measure by the two-beam measuring system because this permits quicker evaluation of the measurement, or quicker indication of the result of the measurement.

It is therefore an object of the invention to improve the aforedescribed accessory so that measurements according to the two-beam method can be performed.

SUMMARY OF THE INVENTION

This object is attained by providing between the beam splitter and the diaphragm a device for forming an image of the diaphragm alternately via each of two optical paths in a plane conjugate with the diaphragm and coincident with the focal plane for a light beam from the eyepiece of the microscope and optical means associated with the beam splitter by means of which images of the diaphragm aperture formed by said device in said plane are reproduced in the focal plane of the observation light beam.

Preferably, the device comprises an optical beam switch with an associated optical system and the two optical paths lie side by side, each comprising a pair of prisms.

In a preferred embodiment the device includes means for imaging the light beam from the eyepiece on the photoelectric sensing device.

Preferably, the diaphragm comprises an iris diaphragm and one of the prisms in at least one of said optical paths is displaceable parallel to the optical axis of the photometer. The device is rotatably mounted so as to be rotatable about the optical axis relative to the beam splitter.

BRIEF DESCRIPTION OF THE DRAWINGS

The invention will be more fully comprehended from the following description when taken in conjunction with the appending drawings, wherein.

DESCRIPTION OF THE PREFERRED EMBODIMENTS

Figure 1:
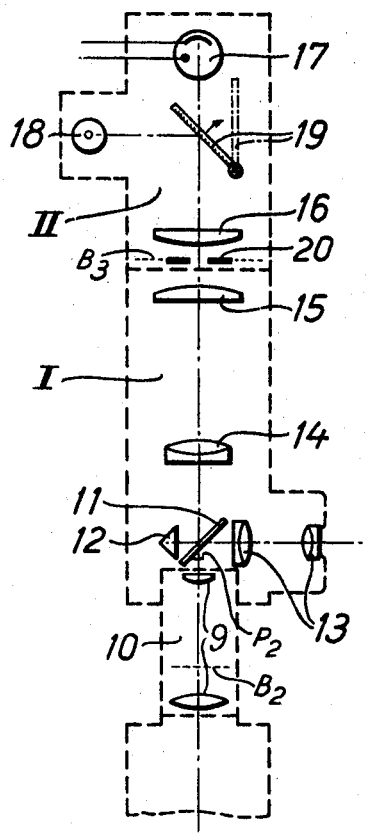
FIG. 1 shows a photometer of known construction.

Referring to FIG. 1, the photometer comprises two constructional units I and II. The constructional unit I which is mounted on the eyepiece tube 10 of the microscope with microscope eyepiece 9 comprises a beam splitter 11, a totally reflecting mirror 12 designed as a triple reflector, and also a monocular telescope 13 for observation. Connected after the beam splitter is an optical system 14 which images the intermediate object image $B_2$ in the plane $B_3$. A field lens 15, together with a field lens 16 mounted on the constructional unit II, images the pupil $P_2$ on to the photomultiplier 17 which is likewise contained in the constructional unit II. A lamp 18 illuminates a diaphragm 20 having a variable aperture, situated in plane $B_3$ by way of a mirror 19. The mirror 19 is pivotally mounted so that in one position (shown in full lines in the drawing) it directs the light of the lamp 18 on to the diaphragm 20 whereas in another position (shown in broken lines in the drawing) it frees the photomultiplier 17 for measurement of the intensity of the image received from the microscope. The two constructional units are screwed together.

Figure 2:
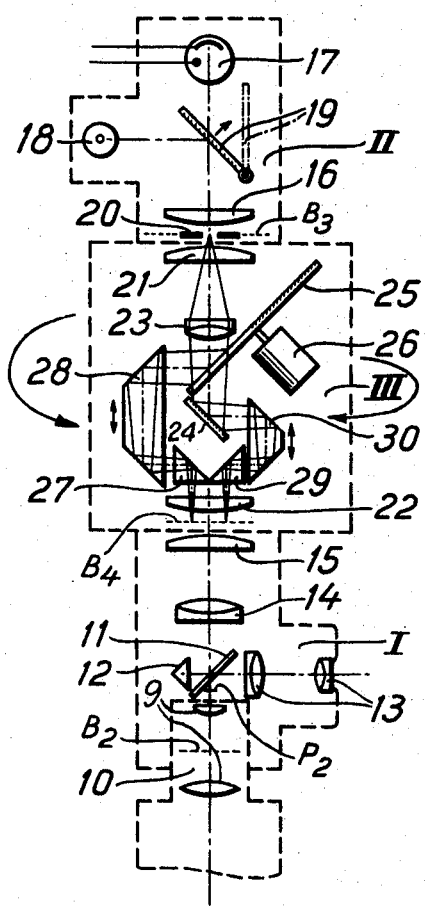
FIG. 2 shows the photometer of FIG. 1 modified according to the present invention.

FIG. 2 shows the same photometer modified by the insertion of a device for two-beam photometry which is shown as constructional unit III between constructional units I and II.

This device comprises two field lenses 21, 22 which, together with the field lenses 15 and 16, image the pupil $P_2$ on the photomultiplier 17. Here the intermediate object image $B_2$ is imaged into the focal plane $B_4$ by means of the optical system 14. A further optical system 23 images this plane $B_4$ in the plane $B_3$ which is coincident with the diaphragm 20. The optical system 23 is associated with an optical beam switch comprising a partially reflecting circular disc 25 which rotates, driven by a motor 26, and permits the incidence of light into the optical system 23 from two different paths. Each path of incident light is defined by a pair of prisms 27, 28 and 29, 30. A fixed mirror 24 is mounted in the path which includes the prisms 29, 30. The prisms 27, 29 are so mounted that their contact edge intersects the optical axis of the microscope and each of these two prisms is associated with another image range in the focal plane $B_4$.

The prisms 28, 30 may be displaceably mounted as indicated by arrows in FIG. 2. Such a modification affords the possibility of carrying the relative distance of the observation ray paths in the object focal plane $B_4$ and of adapting that distance to the distance prevailing there between the images of two objects present simultaneously in the focal plane, so that when the motor 26 is running these two objects are imaged alternatively in the diaphragm 20.

A variation of the observation ray paths in relation to the focal plane $B_4$ can also be achieved by the displacement of the prisms 27, 29 along the optical axis.

Finally it is advantageous to connect the two constructional units I and III with one another rotatably. This gives the possibility of adapting the instrument to the position of the objects in the observation field without the necessity of rotating the object holder. An instrument of this type is thus suitable, for example, for use in conjunction with microscopes with no revolving stage.

What is claimed is:

1. In a microscope apparatus comprising: microscope means (9) defining a main optical path for microscopic examination of an object; main beam splitting means (11, 12) dividing said main path into an observation path and a measurement path, one of which is angularly displaced from said main path; adjustable means (20) defining a restrictive aperture the area of which may be varied, said aperture being located in said measurement path, said beam splitting means causing an image of said aperture to be formed in said observation path; ocular observation means (13) for simultaneously observing the images of said object and of said aperture, said image of said aperture being positioned to indicate that portion of said object from which the illumination will be measured; lighting means (18) for illuminating said aperture to permit observation thereof; and photometric means (17) positioned in said measurement path to receive and measure the intensity of light from said main path after passage of said light through said aperture; the improvement comprising a two-beam photometer having means for switching (25) said image of said aperture alternately into two optical paths located between said aperture and said splitting means, each of said optical paths defined by first (27, 29) and second (28, 30) prisms, said first prisms having contact edges intersecting said measurement path, said second prisms at an angle of 90° to said first prisms, said optical paths forming said image of said aperture in a plane conjugate with said aperture and coincident with the focal plane for said image of said object; optical means (14, 15) in said measurement path between said means for switching and said splitting means for reproducing said images of said aperture from said optical paths in said focal plane for said image of said object; and means in said measurement path between said aperture and said photometric means for imaging (16) said intensity of light from said main path on said photometric means.

2. The microscope apparatus of claim 1, wherein said optical paths are on opposite sides of said measurement path.

3. The microscope apparatus of claim 1, wherein said adjustable means defining a restrictive aperture is an iris diaphragm.

4. The microscope apparatus of claim 1, wherein one of said second prisms is displaceable parallel to said measurement path.

5. The microscope apparatus of claim 1, wherein both of said second prisms are displaceable parallel to said measurement path.

6. The microscope apparatus of claim 1, having between said aperture and said means for switching in said measurement path a first field lens (21) and an optical system 23 for reproducing said image of said object at said aperture.

7. The microscope apparatus of claim 6, having between said means of switching and one of said optical paths a fixed mirror (24).

8. The microscope apparatus of claim 7, wherein said field lens, said optical system, said means for switching, said fixed mirror and said optical paths are housed in a construction element which is rotatable about said measurement path.

9. The microscope apparatus of claim 1, wherein said means for switching comprise a partially reflecting circular disc (25) driven by an electric motor (26).

10. The microscope apparatus of claim 1, wherein said lighting means is combined with a pivotally mounted mirror (19) and said lighting means is combined with a triple reflector (12).

References Cited

UNITED STATES PATENTS

| | | | |
|---|---|---|---|
| 2,685,228 | 8/1954 | Kavanagh | 350—13 |
| 2,699,092 | 1/1955 | Räntsch | 350—33 X |
| 2,950,649 | 8/1960 | Horn | 350—30 X |
| 3,421,806 | 1/1969 | Weber | 350—31 X |
| 3,520,615 | 7/1970 | Smith | 350—12 X |

FOREIGN PATENTS

| | | | |
|---|---|---|---|
| 69,951 | 11/1969 | Germany | 350—30 |

OTHER REFERENCES

Conklin: Journal of the Society of Motion Picture Engineers, vol. 49, No. 6, December 1947, pp. 537–543.

RONALD L. WIBERT, Primary Examiner

F. L. EVANS, Assistant Examiner

U.S. Cl. X.R.

350—17, 91, 169